United States Patent [19]
Schwartz

[11] Patent Number: 5,794,279
[45] Date of Patent: Aug. 18, 1998

[54] WATER SAVER ATTACHMENT FOR TOILETS

[76] Inventor: Shirley Schwartz, 2481 Kaanapali Pkwy. #252, Lahaina, Hi. 96761

[21] Appl. No.: 915,537

[22] Filed: Aug. 15, 1997

[51] Int. Cl.⁶ ........................................ E03D 1/35
[52] U.S. Cl. .................. 4/415; 4/392; 4/394; 4/402; 4/404
[58] Field of Search ................ 4/415, 392–395, 4/402–404, 382, 385, 386, 246.2

[56] References Cited

U.S. PATENT DOCUMENTS

| | | |
|---|---|---|
| 2,773,268 | 12/1956 | Hurko et al. ........................... 4/393 |
| 3,003,156 | 10/1961 | Alexander ............................. 4/393 |
| 3,142,846 | 8/1964 | Lackenmaier et al. .................. 4/402 |
| 3,733,618 | 5/1973 | Wiegand . | 
| 3,959,828 | 6/1976 | Acevedo ............................... 4/393 |
| 3,988,785 | 11/1976 | Schoepe et al. . | 
| 4,028,748 | 6/1977 | Schoepe et al. . | 
| 4,134,165 | 1/1979 | Phripp et al. ......................... 4/392 |
| 5,205,000 | 4/1993 | Xia et al. ............................. 4/402 |
| 5,390,375 | 2/1995 | Fernstrum, Jr. . |

Primary Examiner—Charles R. Eloshway
Attorney, Agent, or Firm—Michael I. Kroll

[57] ABSTRACT

A water saver attachment for toilets being pivotally connected to selectively cover a drain pipe within a flush tank of the toilets. The water saver attachment includes a hollow L-shaped water weight box having a horizontal section with an open top side and a vertical section connected thereto. A support arm is connected to the hollow L-shaped water weight box and a cover is connected to the support arm. The water saver attachment is pivotally connected within the flush tank by a connection device. The water saver attachment is pivotable between a first at rest position in which the cover seals the drain pipe to prevent water from flowing therethrough and a second flushing position in which the water saver attachment is pivoted whereby the cover is pivoted to selectively allow water to flow through the drain pipe. The water saver attachment automatically pivots back to the first at rest position upon completion of flushing of the toilet to limit an amount of water flowing through the drain pipe.

11 Claims, 8 Drawing Sheets

WATER SAVER ATTACHMENT FOR TOILETS

BACKGROUND OF THE INVENTION

1. Field of the Invention

The present invention relates generally to devices for reducing water waste and, more specifically, to a water saver attachment device for reducing the water usage of toilets.

2. Description of the Prior Art

Numerous devices for reducing water waste have been provided in the prior art. For example, U.S. patents numbered U.S. Pat. Nos. 3,733,618; 3,988,785; 4,028,748; 4,224,703 and 5,390,375 all are illustrative of such prior art. While these units may be suitable for the particular purpose to which they address, they would not be as suitable for the purposes of the present invention as heretofore described.

U.S. Pat. No. 3,733,618

Inventor: William A. Wiegand

Issued: May 22, 1973

A water saver attachment for toilet tank flush valves is presented. The attachment includes an automatic one-way vent valve mounted in an opening through the wall of the flush valve. The vent valve may be preset to control the rate of flow therethrough. As the buoyant flush valve vents water replaces the vented air to decrease the buoyancy of the valve causing it to close before all water has drained from the tank. The rate of flow through the vent then is proportional to the amount of water retained in the tank when the flush valve closes. A variety of one-way valves are contemplated, within the scope of this invention, however, in a preferred embodiment, a ball check or stem check valve is utilized. A kit is also disclosed including a vent valve and a punch for making the valve-receiving opening in a conventional flush valve. Flush valves are also described wherein the vent valve is molded therein.

U.S. Pat. No. 3,988,785

Inventor: Adolph Schoepe et al.

Issued: Nov. 2, 1976

A valve seat of an integrated valve seat and closure member assembly is secured by waterproof sealant over the upper end of a flush valve seat portion in a flush tank, the waterproof sealant preferably constituting the sole support for the integrated assembly in the flush tank. The closure member is hingedly connected to the valve seat through a rigid frame which is partially removably telescoped by a resilient material closure portion thereby mounting the closure portion of the closure member hingedly movable downwardly toward and upwardly away from a sealing position with the valve seat. An outwardly depending C-shaped leg on the closure portion of the closure member which inwardly telescopes the closure member frame provides a lower, relatively flat, sealing surface for sealing downwardly against the valve seat in the closure member sealing position. The valve seat preferably has two, upwardly projecting, convex, concentric rings against which the closure member flat resilient sealing surface seals in the closure member sealing position, one of said valve seat convex rings providing initial sealing until the closure member is permanently compressed and then both rings providing the sealing thereafter.

U.S. Pat. No. 4,028,748

Inventor: Adolph Schoepe et al.

Issued: Jun. 14, 1977

A valve seat of an integrated valve seat and closure member assembly is secured by waterproof sealant over the upper end of a flush valve seat portion in a flush tank, the waterproof sealant preferably constituting the sole support for the integrated assembly in the flush tank. The closure member is hingedly connected to the valve seat through a rigid frame which is partially removably telescoped by a resilient material closure portion thereby mounting the closure portion of the closure member hingedly movable downwardly toward and upwardly away from a sealing position with the valve seat. An outwardly depending C-shaped leg on the closure portion of the closure member which inwardly telescopes the closure member frame provides a lower, relatively flat, sealing surface for sealing downwardly against the valve seat in the closure member sealing position. The valve seat preferably has two, upwardly projecting, convex, concentric rings against which the closure member flat resilient sealing surface seals in the closure member sealing position, one of said valve seat convex rings providing initial sealing until the closure member is permanently compressed and then both rings providing the sealing thereafter.

U.S. Pat. No. 4,224,703

Inventor: Walter Makhobey

Issued: Sep. 30, 1980

An attachment for closing all varieties of flush valves before the normal amount of water has exited the tank includes a buoyant float that falls with the water level of the tank during a flush and applies its weight against the flush valve to push the valve prematurely into its seat. A float guide rod attaches to the tank wall and provides a path for the float to move upon, and a valve actuator rod is adjustably connected to the float and directly contacts the flush valve. A variety of attachments to the flush valves or actuator rod are provided for reliable performance. A combination of an entire flush valve assembly with a valve closer incorporated in its structure includes a float guide rod attached to the standpipe of the valve assembly rather than to the tank wall.

U.S. Pat. No. 5,390,375

Inventor: John A. Fernstrum, Jr.

Issued: Feb. 21, 1995

A flapper valve for sealing the discharge outlet in a water tank and for regulating the quantity of water discharged during each flush by reducing the buoyancy of the flapper valve through water inflow into the flapper during flushing. The pivotally mounted flapper has an upper body section including an integral soft annular sealing flange and a downwardly depending body member. A cap is insertable at the lower ends of the side wall and defines a water inflow aperture therein. The cap is of a relatively rigid material and serves to support the buoyancy chamber formed by the upper body portion and the end cap against deformation under operating conditions. The cap may be provided with a valve disk for selective registry with one of multiple apertures to regulate the water inflow into the cone as a

3 function of the dimension of the aperture selected in registry with the opening.

SUMMARY OF THE PRESENT INVENTION

The present invention relates generally to devices for reducing water waste and, more specifically, to a water saver attachment device for reducing the water usage of toilets.

A primary object of the present invention is to provide a water saver attachment for toilets that will overcome the shortcomings of prior art devices.

Another object of the present invention is to provide a water saver attachment for toilets which is able to reduce the amount of water used to flush a toilet by more than half.

A further object of the present invention is to provide a water saver attachment for toilets which obtains all the advantages of retaining 7 gallons of water within the flush tank while only releasing 1.5–2 gallons during each flush of the toilet.

A still further object of the present invention is to provide a water saver attachment for toilets which is able to remove sediment deposited on a bottom of the flush tank and thus provide a self cleaning effect.

An additional object of the present invention is to provide a water saver attachment for toilets including no moving parts.

A further object of the present invention is to provide a water saver attachment for toilets which pivots based upon the laws of gravity and the weight of water contained within the water saver attachment to reseal or re-cover the drain pipe after a flush of the toilet.

A yet further object of the present invention is to provide a water saver attachment for toilets which will decrease the cost due to water usage and provide an increased savings of natural resources.

Another object of the present invention is to provide a water saver attachment for toilets that is simple and easy to use.

A still further object of the present invention is to provide a water saver attachment for toilets that is economical in cost to manufacture.

Additional objects of the present invention will appear as the description proceeds.

A water saver attachment for toilets being pivotally connected to selectively cover a drain pipe within a flush tank of the toilets is described by the present invention. The water saver attachment includes a hollow L-shaped water weight box including a horizontal section having an open top side and a vertical section connected thereto. A support arm is connected to the hollow L-shaped water weight box and a cover is connected to the support arm. The water saver attachment is pivotally connected within the flush tank by a connection device. The water saver attachment is pivotable between a first at rest position in which the cover seals the drain pipe to prevent water from flowing therethrough and a second flushing position in which the water saver attachment is pivoted whereby the cover is pivoted to selectively allow water to flow through the drain pipe. The water saver attachment automatically pivots back to the first at rest position upon completion of flushing of the toilet to limit an amount of water flowing through the drain pipe.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
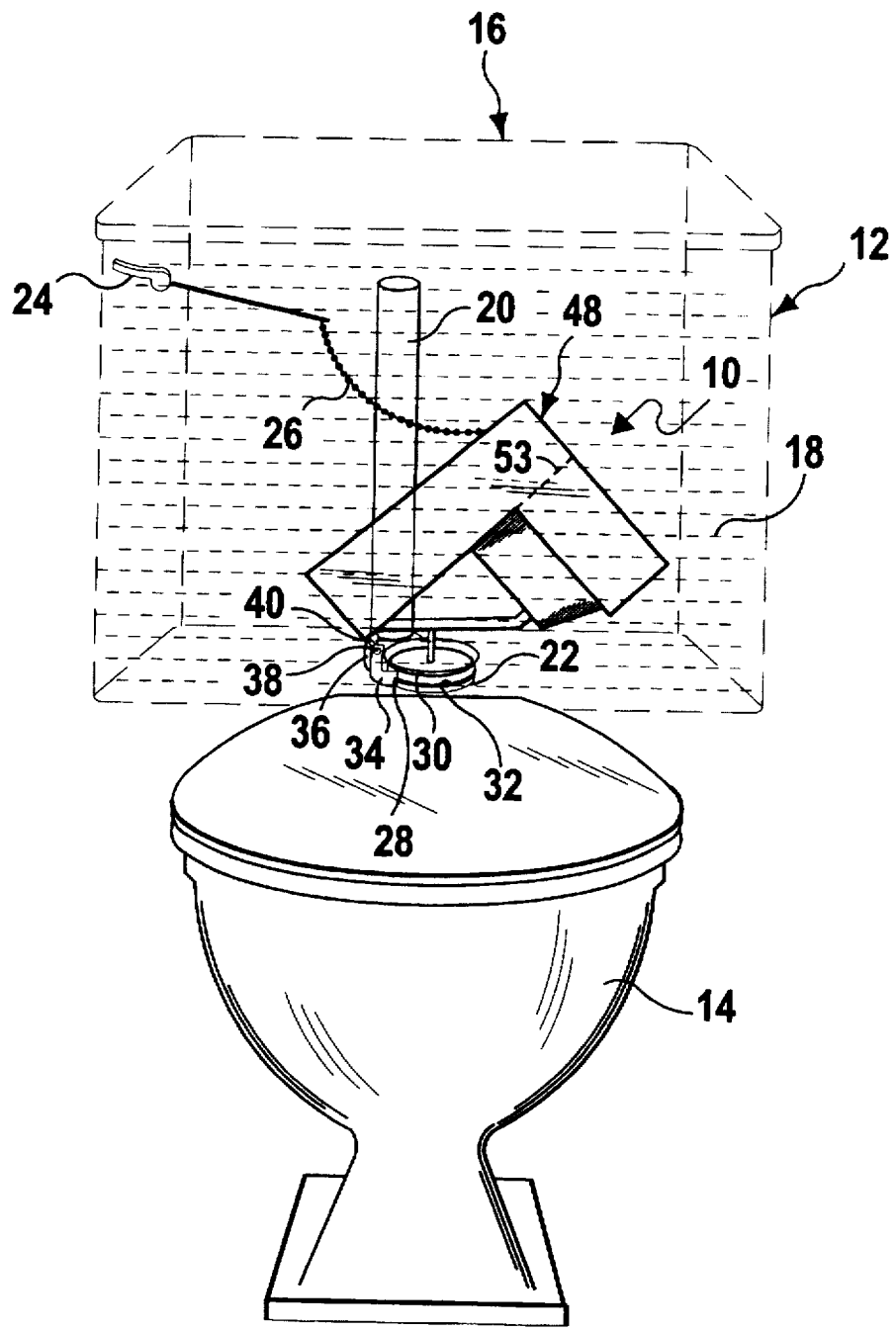
FIG. 1 is a front perspective view of the water saver attachment for toilets of the present invention connected to a toilet flush valve.

Turning now descriptively to the drawings, in which similar reference characters denote similar elements throughout the several views, the Figures illustrate the water saver attachment for toilets of the present invention. With regard to the reference numerals used, the following numbering is used throughout the various drawing figures.

10 water saver attachment for toilets of the present invention
12 toilet
14 bowl of toilet
16 flush tank of toilet
18 water within flush tank
20 water return tube
22 drain pipe
24 handle
26 chain connecting handle to water saver attachment
28 adapter for connecting water saver attachment to drain pipe
30 rim extending from the drain pipe
32 ring of clamp
34 first arm extending from ring
36 second arm extending from ring
38 recess in first arm extending from ring
40 connection device
42 first protrusion extending from connection device
44 second protrusion extending from connection device
46 mid section of connection device
48 hollow L-shaped water weight box
50 horizontal section of hollow L-shaped water weight box 52 vertical section of hollow L-shaped water weight box
53 divider wall within horizontal section of hollow L-shaped water weight box
54 open top side of horizontal section
56 bottom side of vertical section
58 recess in bottom side of vertical section
60 air tight box
62 support arm
64 cover
66 attachment arm
68 arrow indicating direction of movement of handle
70 arrow indicating direction of pivoting of water saver attachment
72 arrow indicating direction of flow of water through drain pipe
74 arrow indicating direction of flow of water into horizontal section
76 arrow indicating direction of flow of water through vertical section
78 arrow indicating direction of flow of water through recess in base of vertical section
80 arrow indicating direction of flow of water through recess in base of vertical section and drain pipe
82 arrow indicating direction of force applied by water during flush to remove sediment from bottom of flush tank
84 arrow indicating direction of pivot of water saver attachment after flush of toilet

DETAILED DESCRIPTION OF THE PREFERRED EMBODIMENT

Turning now descriptively to the drawings, in which similar reference characters denote similar elements throughout the several views, FIGS. 1 through 8 illustrate a water saver attachment indicated generally by the numeral 10.

The water saver attachment 10 is connected to reduce the amount of water used when flushing a toilet 12. The toilet 12 includes a bowl 14 and a flush tank 16 connected thereto. The flush tank 16 is filled with water 18 and includes a water return tube 20 and drain pipe 22 positioned therein. The amount of water 18 within the flush tank 16 is equal to that of conventional toilets 12, i.e. approximately seven (7) gallons. However, the water saver attachment 10 of the present invention reduces the amount of water allowed to exit the flush tank 16 during a flush of the toilet 12 to a minimum, approximately 1.5–2 gallons. A handle 24 is positioned on an outer side of the flush tank 16 for initiating a flush of the toilet 12. The flushing action of the toilet 12 acts to move the contents in the bowl 14 to the sewer system using the water 18 from the flush tank 16. The handle 24 is connected to the water saver attachment 10 by a chain 26 connected therebetween.

The water saver attachment 10 is connected to removably cover the drain pipe 22 by a clamp 28. The clamp 28 is a commercially available device which easily connects around a rim 30 of the drain pipe 22 and forms no part of the present invention. A preferred embodiment for the clamp 28 includes a ring 32 and first and second arms 34 and 36 extending therefrom. Each arm 34 and 36 includes a respective recess 38 extending therethrough at an end opposite the connection to the ring 32 (the recess extending through the second arm 36 is not viewable in the drawings).

Figure 2:
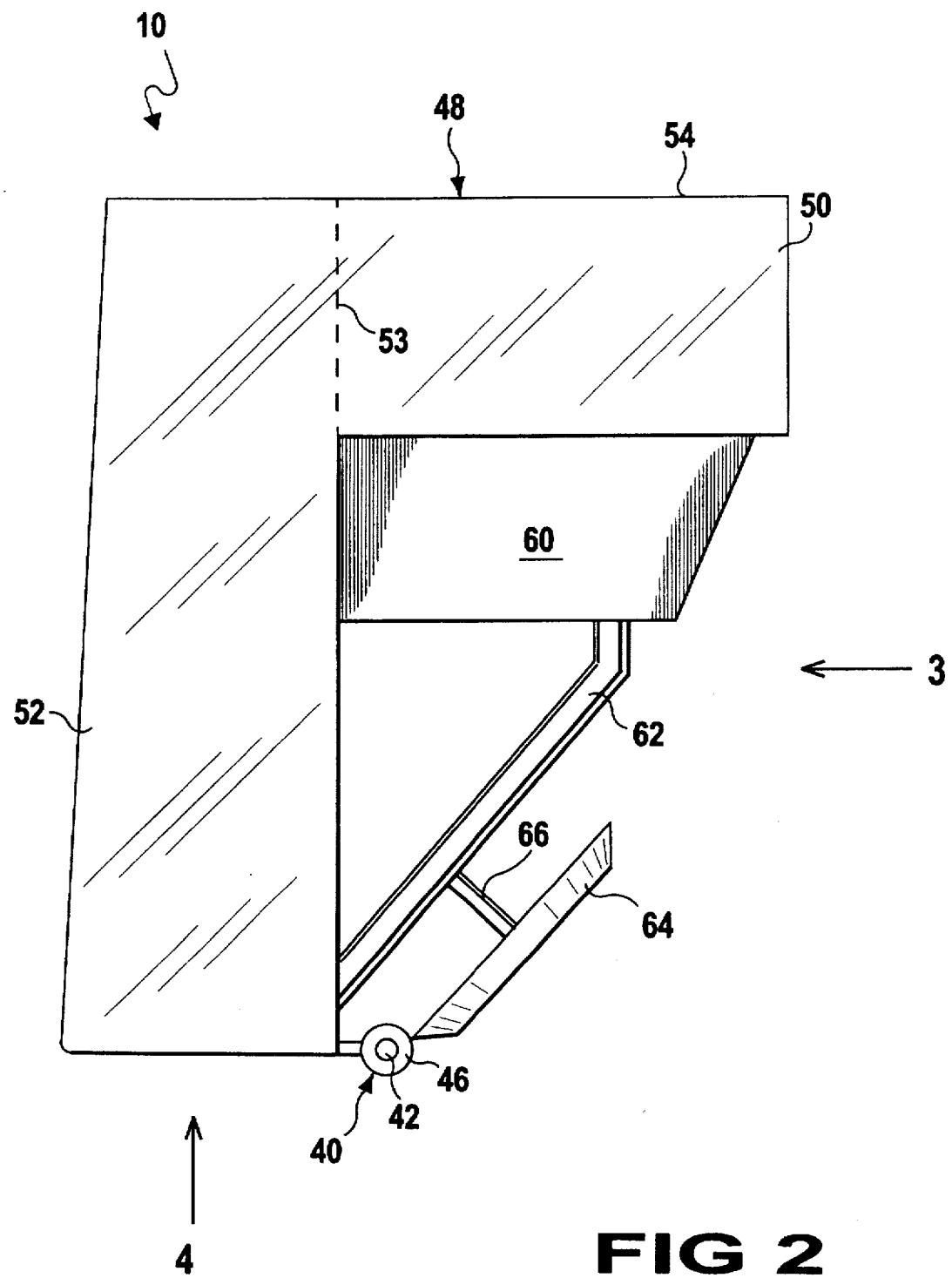
FIG. 2 is an elevated side view of the water saver attachment for toilets of the present invention.
Figure 3:
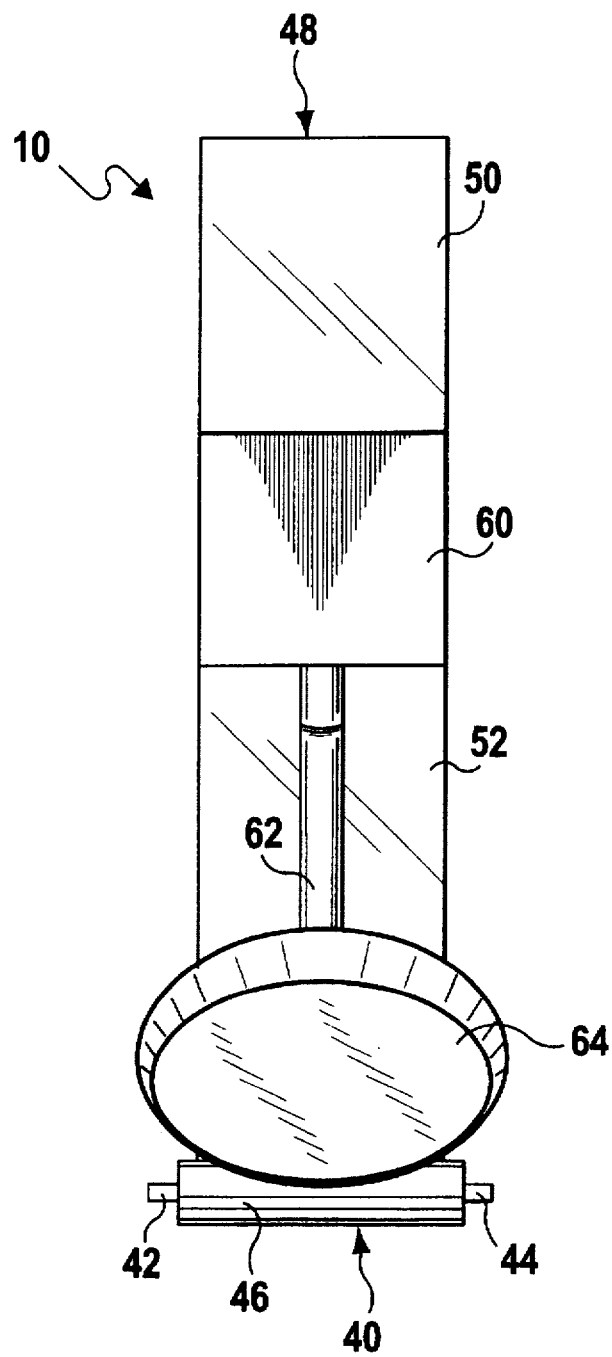
FIG. 3 is an elevated front view of water saver attachment for toilets of the present invention taken in the direction of the arrow labeled 3 in FIG. 2.
Figure 4:
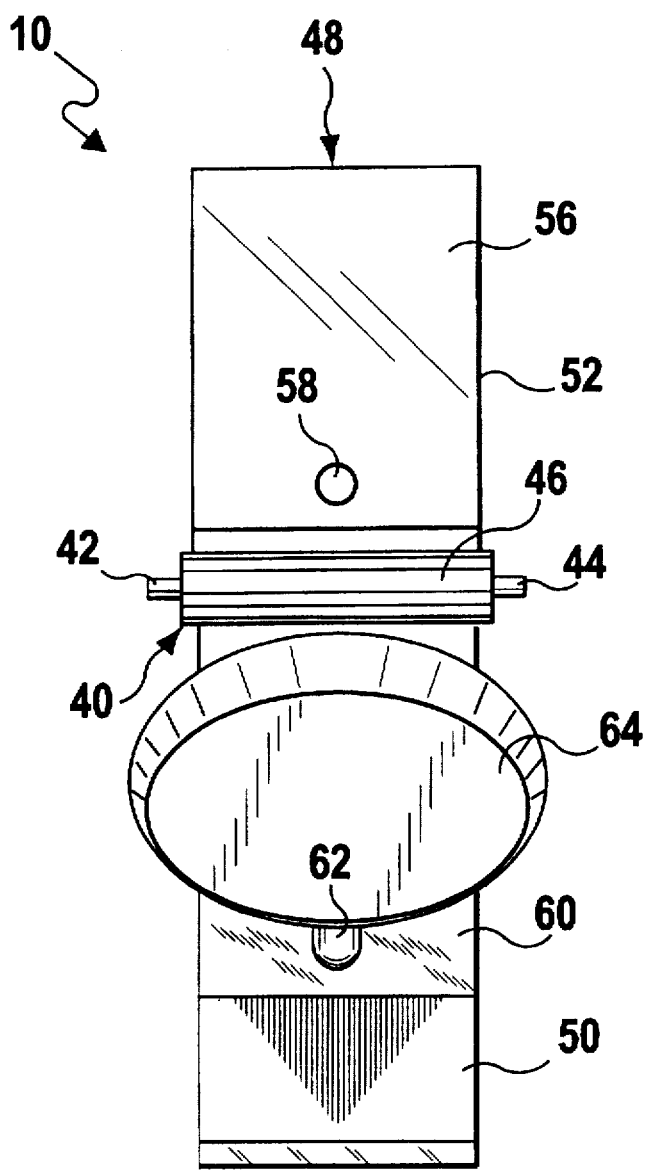
FIG. 4 is a perspective bottom view of water saver attachment for toilets of the present invention taken in the direction of the arrow labeled 4 in FIG. 2.

The water saver attachment 10 can be more clearly seen in FIGS. 2–4 and includes a connection device 40 having first and second protrusions 42 and 44 extending from a mid section 46 thereof. The length of the mid section 46 is slightly less than the distance between the arms 34 and 36 of the clamp 28 and therefore can fit between the arms 34 and 36. The first and second protrusions 42 and 44 are positioned to extend through a respective recess in each of the first and second arms 34 and 36 and thereby pivotally connect the water saver attachment 10 to the rim 30.

The water saver attachment 10 includes a hollow L-shaped water weight box 48 including a horizontal section 50 and a vertical section 52. A top side 54 of the horizontal section 50 is open allowing water to flow therein. A divider wall 53 is positioned within the horizontal section 50 to inhibit the flow of water contained therein during pivoting of the water saver attachment 10 as will be explained hereinafter. The divider wall 53 is preferably positioned to separate the horizontal section 50 into two areas, one occupying one-third (⅓) the area of the horizontal section 50 and the other occupying two-thirds (⅔) the area of the horizontal section 50. A bottom side 56 of the vertical section 52 includes a recess 58 extending therethrough. The horizontal and vertical sections 50 and 52 are in communication with each other allowing water 18 entering the top side 54 of the horizontal section 50 to flow into the vertical section 52 and through the recess 58 in the bottom side thereof. An air tight box 60 is connected between the horizontal and vertical sections 50 and 52, on a side of the horizontal section 50 opposite the open top side 54. A support arm 62 is connected between the air tight box 60 and the vertical section 52. Connected to the support arm 62 is a cover 64. The connection of the cover 64 to the support arm 62 is accomplished via a connection arm 66. The cover 64 is sized to fit over and create a removable seal with the drain pipe 22 in the flush tank 16 and thus allow selective release of water flow therethrough.

Figure 5:
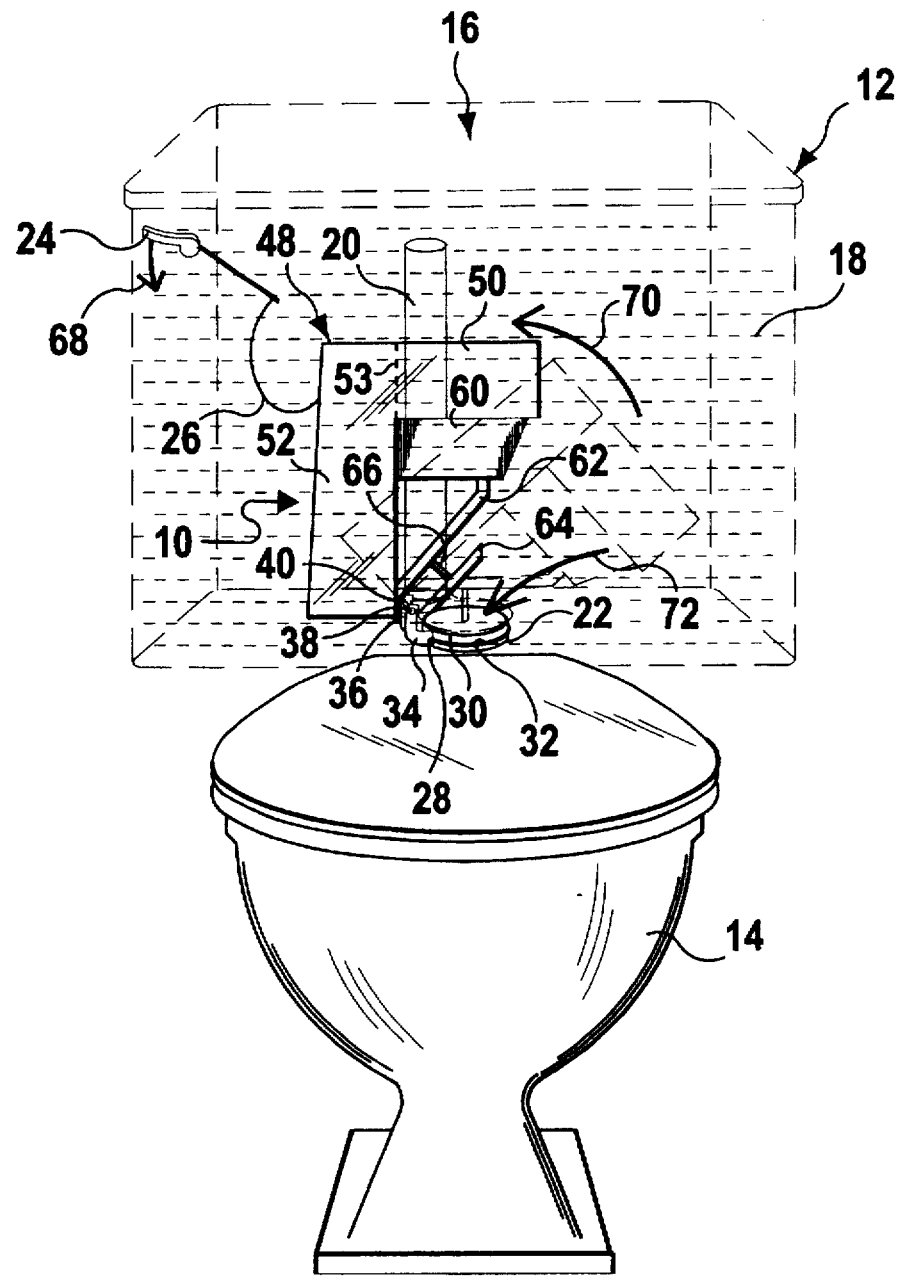
FIG. 5 is an elevated front view of a toilet including the water saver attachment for toilets of the present invention in a raised position, the closed position being shown in dashed lines.

FIG. 5 illustrates the motion of the water saver attachment 10 during a flush of the toilet 12. The at rest, non flush position of the water saver attachment 10 is shown in dashed lines. In this position, the cover 64 is positioned over the recess 22 so as to prevent water 18 from flowing therethrough. The hollow L-shaped water weight box 48 is angled whereby the horizontal section 50 and vertical section 52 extend at angles to a base of the flush tank 16. The water saver attachment 10 is completely submerged in the water 18 within the flush tank 16 and thus the hollow L-shaped water weight box 48 is completely filled with water 18.

When the handle 24 is pivoted in the direction shown by the arrow labeled 68 a force is applied to the chain 26. The chain 26 is attached to the water saver attachment 10 and causes the water saver attachment 10 to pivot towards the handle 24 in the direction of the arrow labeled 70. The hollow L-shaped water weight box 48 is pivoted whereby the horizontal section 50 extends parallel to the base of the flush tank 16 and the vertical section 52 extends perpendicular to the base of the flush tank 52. When the water saver attachment 10 pivots in this manner the cover 64 is caused to pivot therewith and uncover the drain pipe 22 allowing the water 18 within the flush tank 22 to flow therethrough in the direction of the arrow labeled 72. Water 18 is retained on a side of the horizontal section 50 opposite the connection to the vertical section 52 by the divider wall 53.

Figure 6:
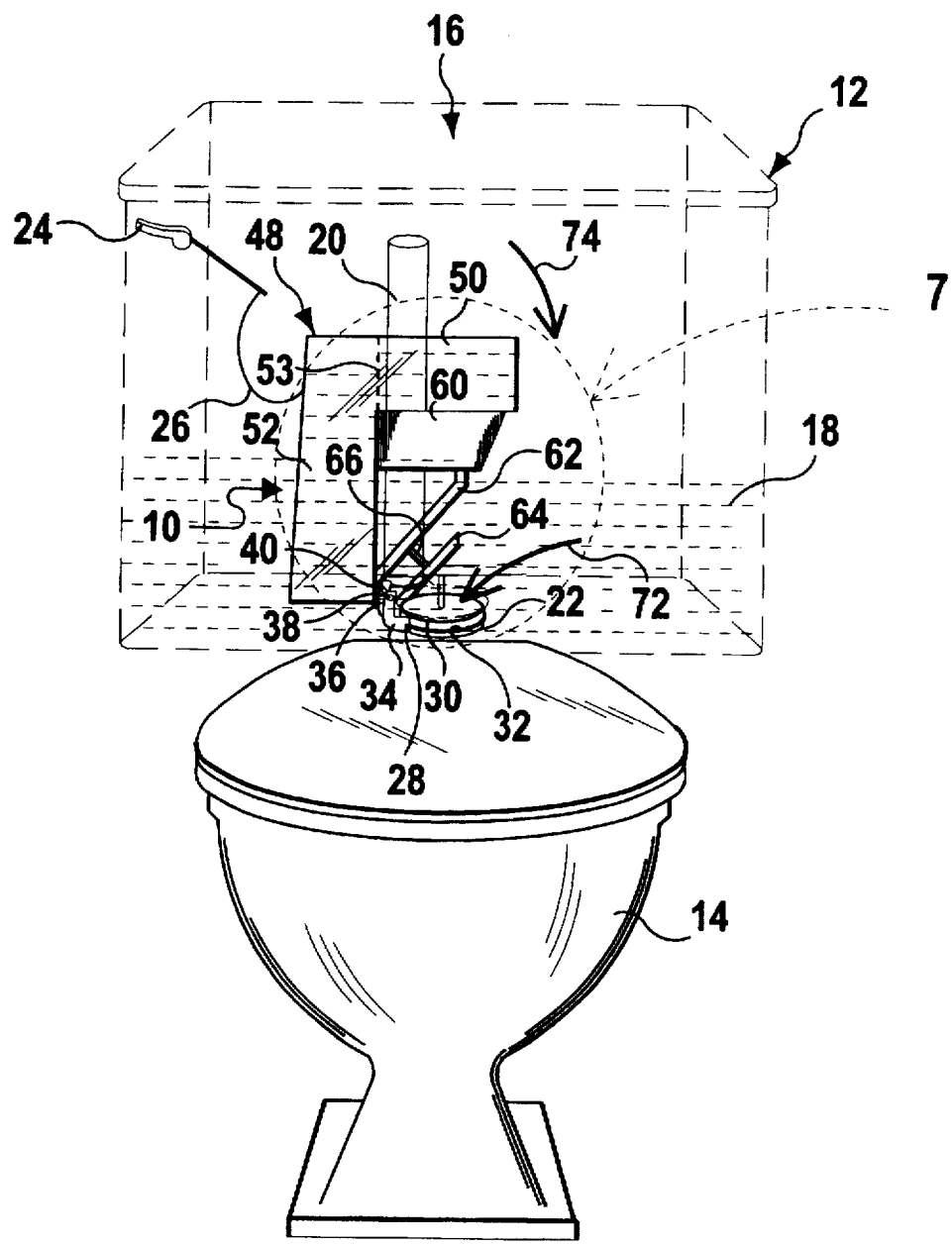
FIG. 6 is an elevated front view of a toilet including the water saver attachment for toilets of the present invention in its raised position.

FIG. 6 illustrates the motion of water 18 after release of the handle 24 and during a flush of the toilet 12. Prior to release of the handle 24 the water saver attachment 10 is pivoted into the position shown. In this position, the cover 64 is angled so as not to cover the recess 22 allowing water 18 to flow therethrough. The hollow L-shaped water weight box 48 is positioned such that the horizontal section 50 extends parallel to the base of the flush tank 16 and the vertical section 52 extends perpendicular to the base of the flush tank 16. In this position a small amount of water 18 is allowed to flow through the recess 58 in the base of the vertical section 52. When the handle 24 is released the force is removed from the chain 26. Water is caused to flow through the water return tube 20 and into both the open top side 54 of the horizontal section 50 and the flush tank 16 as is indicated by the arrow labeled 74. The water which flows into the open top side 54 of the horizontal section 50 will replace the water 18 which was dispersed through the recess 58 as water 18 within the flush tank 22 continues to flow through the drain pipe 22 in the direction of the arrow labeled 72.

Figure 7:
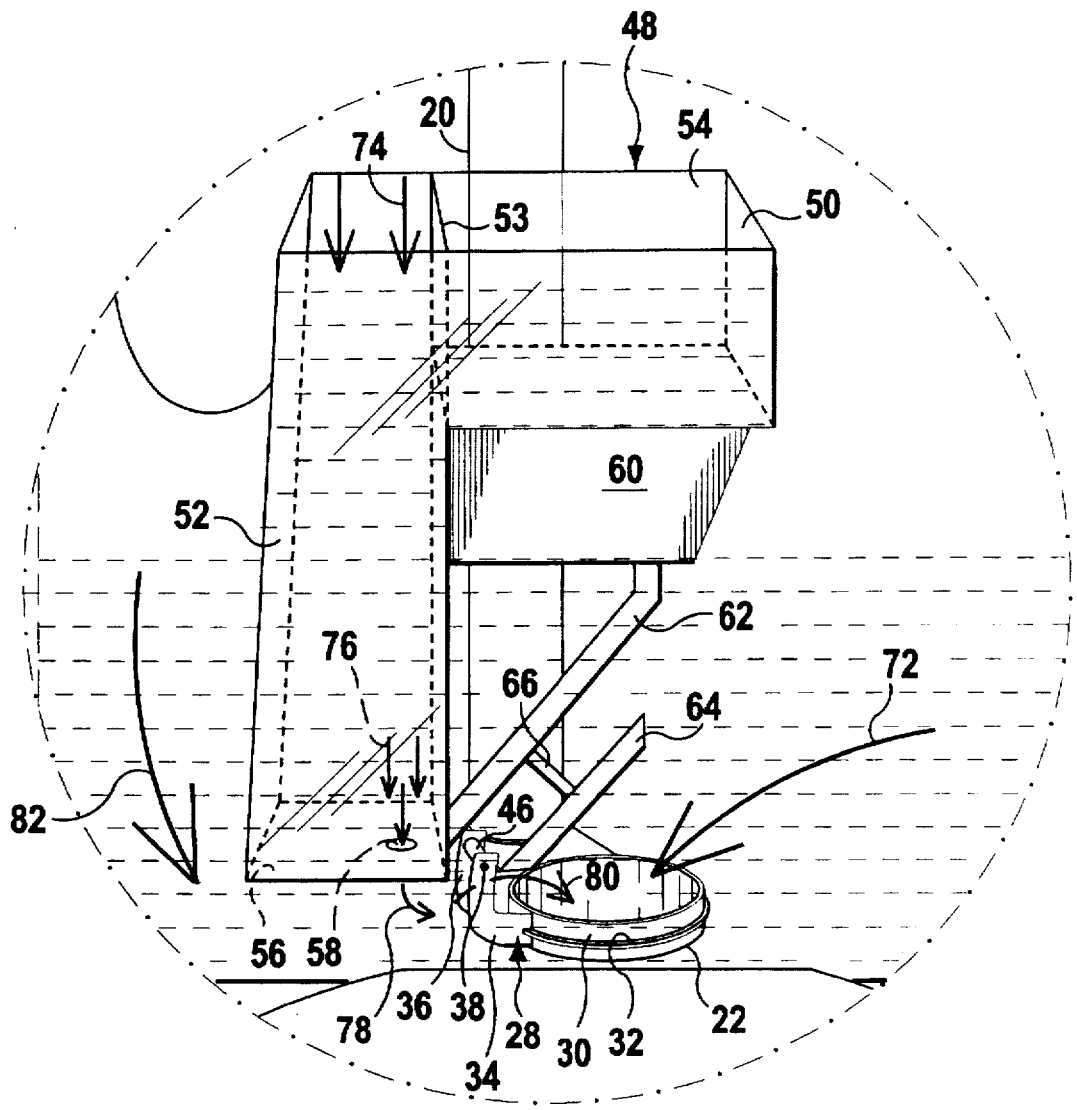
FIG. 7 is an exploded front view of the water saver attachment for toilets of the present invention within the circle labeled 7 of FIG. 6 illustrating the flow of water within the flush tank.

FIG. 7 illustrates an exploded view of the water saver attachment 10 in the position shown in FIG. 6 illustrating in more detail the flow of water through the water saver attachment 10. The water flowing out of the water return tube 20 flows into the open top side 54 of the horizontal section 50 to replace the water exiting the vertical section 52 through the recess 58. The water flows through the vertical section 52 in the direction of the arrows labeled 76, through the recess 58 and out of the hollow L-shaped water weight box 48 in the direction of the arrow labeled 78. As the recess 58 is smaller than the open top side 54, water flows into the hollow L-shaped water weight box 48 through the open top side 54 faster than it flows through the recess 58 causing the hollow L-shaped water weight box 48 to remain filled with water 18 and the divider wall 53 retains water within the horizontal section 50 to the right of the divider wall 53 as depicted in the drawings. Water from the bottom of the flush tank 16 is caused to flow through the drain pipe 22 as indicated by the arrow labeled 80 due to a force applied on the base of the flush tank 16 by a weight of the column of water caused to remain in the flush tank 16. This force, indicated by the arrow labeled 82, is directed at the base of the flush tank 16 and causes the sediment and impurities contained thereon to be carried out through the drain pipe 22 with the flow of water indicated by the arrow labeled 80. This action cleans the bottom of the flush tank 16 preventing sediment and impurities from collecting thereon.

Figure 8:
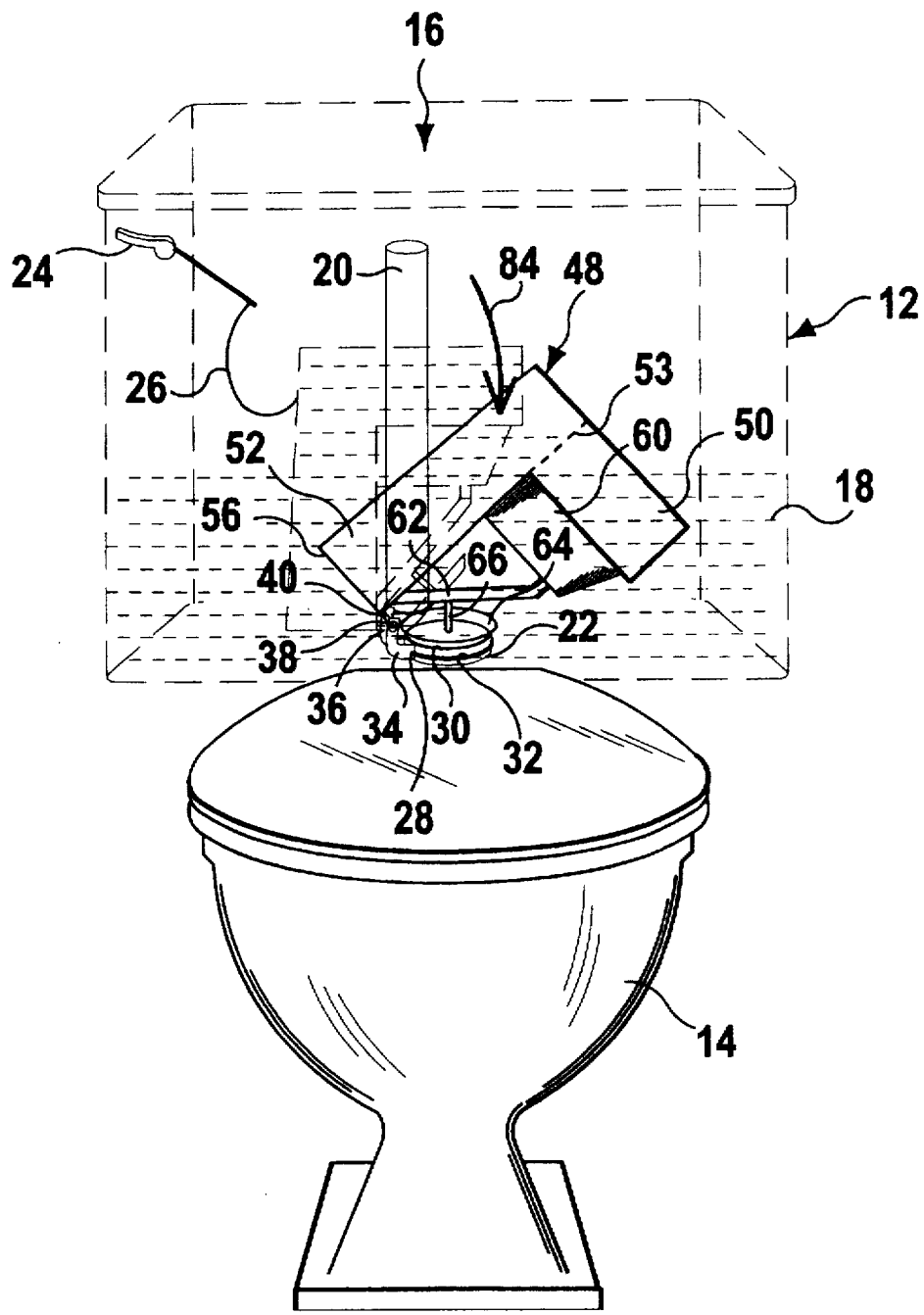
FIG. 8 is an elevated front view of a toilet including the water saver attachment for toilets of the present invention in a closed position, the raised position being shown in dashed lines.

The pivotal movement of the water saver attachment 10 after a flush of the toilet 12 is illustrated in FIG. 8. As the hollow L-shaped water weight box 48 refills with water 18, the weight of the water 18 retained within the horizontal section 50 by the divider wall 53, the weight of the air tight box 60 along with the force of gravity causes the water saver attachment 10 to pivot in the direction of the arrow labeled 80 and thus pivot the cover 64 to reseal the drain pipe 22 and prevent water from flowing therethrough. The additional water retained in the horizontal section 50 by the divider wall 53 causes the water saver attachment 10 to pivot more quickly due to the added weight contained within the hollow L-shaped water weight box 48. This completes the flushing process.

In prior methods of flushing a toilet 12, the drain pipe 22 was left uncovered until the flush tank 16 filled with water 18 to a predetermined level. This caused the entire flush tank 16 to empty and thus use and waste a large amount of water with each flush. As the hollow L-shaped water weight box 48 is caused to remain filled with water it is caused to pivot immediately after the handle 24 is released to cover the drain pipe 22 prior to emptying of the flush tank 16 and thus prevent a large amount of water 18 from unnecessarily flowing therethrough when the handle 24 is pivoted. This prevents excess water from flowing through the drain pipe 22 and thus saves a substantial amount of water with each flush of the toilet 12. Using the water saver attachment 10 of the present invention, the amount of time it takes to cover the drain pipe 22 is dependent on the size of the hollow L-shaped water weight box 48 and the speed at which it will pivot back to its rest position.

The operation of the device will now be described with reference to the figures. In operation, the water saver attachment 10 is positioned within a toilet 12 whereby the protrusions 42 and 44 extending from the connection device 28 are positioned within respective recesses in the arms 34 and 36 extending from the ring 32 of the clamp 28. The cover 64 is positioned to prevent water 18 from flowing through the drain pipe 22 and the hollow L-shaped water weight box 48 is positioned at an angle with the base of the flush tank 16 such that the open top side 54 of the horizontal section is angled away from the base and the recess 58 is angled towards the base of the flush tank 16. The water saver attachment 10 is completely submerged in the water 18 within the flush tank 16 and thus the hollow L-shaped water weight box 48 is completely filled with water.

In order to flush the toilet 12, the handle 24 must be pivoted in the direction of arrow 68. This causes a force to be applied to the chain 26 and thus to the water saver attachment 10 causing it to pivot towards the handle 24 in the direction of arrow 70. As the water saver attachment 10 pivots towards the handle 24 the cover 64 pivots therewith causing the drain pipe 22 to be uncovered and thus allow water 18 to flow therethrough in the direction of arrow 72.

When the handle 24 is released water flows back into the flush tank 16 through the water return tube 20 and refills the small amount of water 18 which was released through the recess 58. The water which flows through the vertical section as indicated by the arrows 76 and through the recess 58 as indicated by the arrow 78 flows through the drain pipe 22 as indicated by the arrow 80 prior to covering of the drain pipe 22 by the cover 64. Other water 18 within the flush tank 16 flows through the drain pipe 22 as indicated by the arrow 72 prior to covering of the drain pipe 22 by the cover 64. A force as indicated by the arrow 82 due to the weight of the column of water remaining within the flush tank 16 causes sediment and impurities on the base of the flush tank 16 to flow with the water 18 and through the drain pipe 22 thereby cleaning the base of the flush tank 16. As the force applied to pivot the water saving attachment 10 is removed when the handle 24 is released, the weight of the water retained within the horizontal section 50 by the divider wall 53 of the hollow L-shaped water weight box 48, the weight of the air tight box 60 and the force of gravity causes the water saving attachment 10 to immediately pivot back to its rest position and cover the drain pipe 22. The pivoting of the water saving attachment 10 occurs over a short period of time allowing only a small amount of water 18 to flow through the drain pipe 22 prior to sealing by positioning the cover 64 thereon. Thus, only a predetermined small amount of water 18 is allowed to flow through the drain pipe 22. This saves a substantial amount of water over prior art devices which allow water to flow through the drain pipe 22 for an extended period of time. Conventional prior art devices allowed the entire 7 gallons of water filling the flush tank 16 to flow through the drain pipe 22 while the water saving attachment 10 of the present invention allows only approximately 1.5–2 gallons of water to flow through the drain pipe 22 during each flush.

From the above description it can be seen that the water saver attachment for toilets of the present invention is able to overcome the shortcomings of prior art devices by providing a water saver attachment for toilets which is able to reduce the amount of water used to flush a toilet by more than half. The water saver attachment for toilets includes no moving parts, obtains all the advantages of retaining 7 gallons of water within the flush tank while only releasing 1.5–2 gallons during each flush of the toilet, is able to remove sediment deposited on a bottom of the flush tank to provide a self cleaning effect and operates based upon the laws of gravity and the weight of water within the flush box. The water saver attachment for toilets will also decrease the cost due to water usage and provide an increased savings of natural resources. Furthermore, the water saver attachment for toilets of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A water saver attachment for toilets adapted to be pivotally mounted in a toilet flush tank to selectively cover a drain pipe within the flush tank, said water saver attachment including:

a) a hollow L-shaped water weight box including a horizontal section having an open top side and a vertical section connected thereto and extending downwardly from an end thereof;

b) a support arm connected between the horizontal and vertical sections of said hollow L-shaped water weight box;

c) a cover connected to said support arm; and d) means for pivotally mounting said water saver attachment within the flush tank wherein said water saver attachment is pivotable between a first at rest position in which said cover seals the drain pipe to prevent water from flowing therethrough and a second flushing position in which said water saver attachment is pivoted whereby said cover is pivoted to selectively allow water to flow through the drain pipe, said water saver attachment automatically pivoting back to said first at rest position upon completion of said flushing of said toilet due to the counterbalance caused by the weight of water retained within said hollow L-shaped water weight box to limit the amount of water flowing through the drain pipe.

2. The water saver attachment for toilets as recited in claim 1, wherein said horizontal section of said hollow L-shaped water weight box includes a divider wall positioned therein for dividing said horizontal section into first and second areas and retaining water within one of said first and second sections during a flush of the toilet.

3. The water saver attachment for toilets as recited in claim 2, wherein said divider wall separates said horizontal section whereby said first section occupies an area equal to one third an area of said horizontal section and said second section occupies an area equal to two-thirds an area of said horizontal section.

4. The water saver attachment for toilets as recited in claim 1, wherein said vertical section includes a bottom side opposite its connection to said horizontal section and a recess extending through said bottom side permitting an amount of water contained within said vertical section to flow back into the flush tank.

5. The water saver attachment for toilets as recited in claim 1, further comprising an air tight box connected to a side of said horizontal section opposite said open top side for providing extra weight to said water saver attachment and aiding in the automatic pivoting of said water saver attachment after a flush of the toilet.

6. The water saver attachment for toilets as recited in claim 1, wherein said toilet flush tank holds about 7 gallons of flush water, said water saver attachment allowing an amount of water within a range of 1.5–2 gallons to flow through the drain pipe during a flush of the toilet.

7. The water saver attachment for toilets as recited in claim 1, wherein said vertical section is connected to extend perpendicular to said horizontal section and is in fluid communication therewith.

8. The water saver attachment for toilets as recited in claim 1, further comprising a connection arm connected between said support arm and said cover.

9. The water saver attachment for toilets as recited in claim 1, wherein said cover includes a diameter at least equal to a diameter of said drain pipe.

10. The water saver attachment for toilets as recited in claim 1, wherein said means for pivotally connecting is connected to said hollow L-shaped water weight box and includes a mid section and first and second protrusions extending from opposing ends of said midsection.

11. The water saver attachment for toilets as recited in claim 1, wherein a clamp is adapted to be connected around the drain pipe for connection with said means for pivotally connecting.

* * * * *